United States Patent
Wolfner et al.

(10) Patent No.: US 11,564,075 B2
(45) Date of Patent: Jan. 24, 2023

(54) WARNING SYSTEM IN PRIVATE NETWORK

(71) Applicant: Nokia Technologies Oy, Espoo (FI)

(72) Inventors: Gyoergy Wolfner, Budapest (HU); Betsy Covell, Chicago, IL (US); Sung Hwan Won, Flower Mound, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/080,782

(22) Filed: Oct. 26, 2020

(65) Prior Publication Data
US 2022/0132288 A1    Apr. 28, 2022

(51) Int. Cl.
| | |
|---|---|
| *H04W 4/90* | (2018.01) |
| *H04W 48/20* | (2009.01) |
| *H04W 48/16* | (2009.01) |
| *H04W 4/06* | (2009.01) |
| *H04W 12/03* | (2021.01) |
| *H04W 12/0433* | (2021.01) |
| *H04W 84/04* | (2009.01) |

(52) U.S. Cl.
CPC .............. *H04W 4/90* (2018.02); *H04W 4/06* (2013.01); *H04W 12/03* (2021.01); *H04W 12/0433* (2021.01); *H04W 48/16* (2013.01); *H04W 48/20* (2013.01); *H04W 84/042* (2013.01)

(58) Field of Classification Search
CPC ......... H04W 4/90; H04W 4/06; H04W 12/03; H04W 12/0433; H04W 48/16; H04W 48/20; H04W 84/042
See application file for complete search history.

(56) References Cited

U.S. PATENT DOCUMENTS

| | | | |
|---|---|---|---|
| 2015/0195774 A1* | 7/2015 | Lee ................... | H04W 36/0077 370/312 |
| 2017/0086047 A1* | 3/2017 | Buckley ................. | H04W 4/90 |
| 2019/0289531 A1* | 9/2019 | Takahashi ............. | H04W 48/08 |

OTHER PUBLICATIONS

3rd Generation Partnership Project; Technical Specification Group Services and system Aspects; Services aspects; Services principles (Release 10); 3GPP TS 22.101 v10.10.0 (Dec. 2012) (60 pages).
3rd Generation Partnership Project; Technical Specification Group Services and system Aspects; Services requirements for the Internet Protocol (IP) Multimedia core network Subsystem (IMS); Stage 1 (Release 16); 3GPP TS 22.228 v17.0.0 (Dec. 2019) (51 pages).
(Continued)

*Primary Examiner* — Mazda Sabouri
(74) *Attorney, Agent, or Firm* — Mintz Levin Cohn Ferris Glovsky and Popeo, P.C.

(57) ABSTRACT

Methods and apparatus, including computer program products, are provided for public warning messages. In some example embodiment, there may be provided a method including receiving, at a user equipment, an indication, wherein the indication indicates whether a radio access network provides support for public warning system warning messages and/or indicates whether the radio access network allows the public warning system warning messages to be received by non-allowed user equipment; and deciding, by the user equipment, whether to select or reselect the radio access network based on the received indication. Related systems, methods, and articles of manufacture are also disclosed.

13 Claims, 5 Drawing Sheets

(56) References Cited

OTHER PUBLICATIONS

3rd Generation Partnership Project; Technical Specification Group Services and System Aspects; Service requirements for the 5G system; Stage 1 (Release 17); 3GPP TS 22.261 V17.1.0 (Dec. 2019) (83 pages).
3rd Generation Partnership Project; Technical Specification Group Cpre Network and Terminals; Technical realization of Cell Broadcast Service (CBS); (Release 15; 3GPP TS 23.041 V15.5.0 (Mar. 2019) (98 pages).
3rd Generation Partnership Project; Technical Specification Group Services and System Aspects; System Architecture for the 5G System; Stage 2 (Release 15); 3GPP TS 23.501 v15.5.0 (Mar. 2019) (241 pages).
3rd Generation Partnership Project; Technical Specification Group Core Network and Terminals; Characteristics of the Universal Subscriber Identity Module (USIM) application (Release 16); 3GPP TS 31.102 V16.1.0 (Sep. 2019) (318 pages).
3rd Generation Partnership Project; Technical Specification Group Radio Access Network; NR; NR and NG-RAN Overall Description; Stage 2 (Release 15); 3GPP TS 38.300 V15.10.0 (Jul. 2020) (100 pages).
3GPP TSG-RAN WG2 Meeting #108; Reno, USA, Nov. 18-22, 2019; R2-1916345; (2 pages).

\* cited by examiner

WARNING SYSTEM IN PRIVATE NETWORK

FIELD

The subject matter described herein relates to wireless communications.

BACKGROUND

Public warning system (PWS) notifications may be provided in the cellular system to warn users of emergencies or provide other important information. For example, the PWS system may provide a message broadcast over cellular to user equipment (UE) in a defined area to warn of earthquake, tsunami, or other emergencies. In 5G, there is provided support in the system for PWS.

SUMMARY

In some example embodiment, there may be provided a method including receiving, at a user equipment, an indication, wherein the indication indicates whether a radio access network provides support for public warning system warning messages and/or indicates whether the radio access network allows the public warning system warning messages to be received by non-allowed user equipment; and deciding, by the user equipment, whether to select or reselect the radio access network based on the received indication.

In some variations, one or more of the features disclosed herein including the following features can optionally be included in any feasible combination. The radio access network may serve a non-public network restricting access to a private set of user equipment. The radio access network may not provide the private set of user equipment access to radio resources of a public land mobile network. The non-public network may provide access to a closed group comprising the set of user equipment. The non-allowed user equipment may not be allowed to access resources of the non-public network, is not registered with the non-public network, and/or is not credentialed to access the resources of the non-public network. The indication may be received via a broadcast from a base station and/or received via a message from the base station. The indication may be received via a system information block type 1 broadcast and/or received via a network access stratum message. An encrypted warning message of the public warning system may be received via a cell broadcast from a base station. The encrypted warning message may be decrypted, based on a key. The key, an identifier of the key, a public key identifier, and/or or key set identifier may be received via the cell broadcast or via a network access stratum message. The deciding may further include prioritizing the selection of the radio access network when the radio access network provides support for public warning system warning messages and/or allows the public warning system warning messages to be received by non-allowed user equipment.

In some example embodiment, there may be provided a method including sending, by a base station, an indication to at least a user equipment, wherein the indication indicates whether a radio access network provides support for public warning system warning messages and/or indicates whether the radio access network allows the public warning system warning messages to be received by non-allowed user equipment; and allowing, by the base station, access to the radio access network based on the indication.

In some variations, one or more of the features disclosed herein including the following features can optionally be included in any feasible combination. The radio access network may serve a non-public network restricting access to a private set of user equipment. The radio access network may not provide the private set of user equipment access to radio resources of a public land mobile network. The non-public network may provide access to a closed group comprising the set of user equipment. The non-allowed user equipment may not be allowed to access resources of the non-public network, may not be registered with the non-public network, and/or may not be not credentialed to access the resources of the non-public network. The indication may be sent via a broadcast from the base station and/or sent via a message from the base station. The indication may be sent via a system information block type 1 broadcast and/or sent via a network access stratum message. An encrypted warning message of the public warning system may be sent via a cell broadcast from the base station. The key, an identifier for of key, a public key identifier, and/or or key set identifier may be sent via the cell broadcast or via a network access stratum message The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
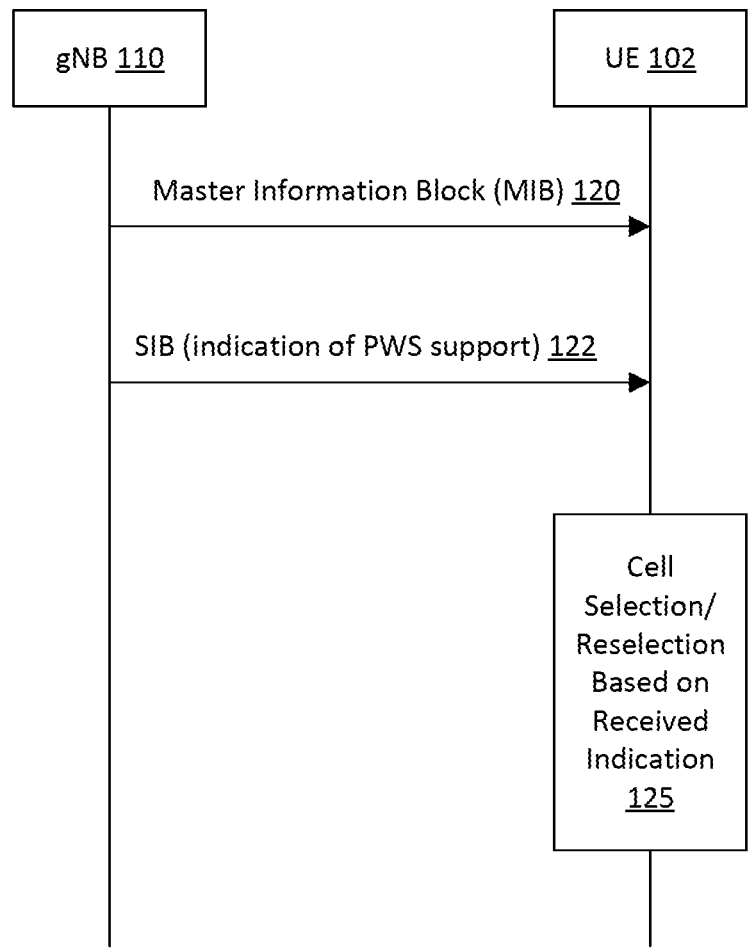
FIG. 1 depicts an example of a process flow between a user equipment and a radio access network node related to indicating support for public warning system messages, in accordance with some example embodiments.

Like labels are used to refer to same or similar items in the drawings.

DETAILED DESCRIPTION

According to current Third Generation Partnership Project (3GPP) standard specifications, when a user equipment (UE) is in an idle or an inactive state and cannot find a "suitable cell" (e.g., a cell that meets certain radio criteria for selection, does not bar the UE from accessing the cell, and the UE belongs to the selected, or registered network, associated with the cell as further described in 3GPP TS 38.304), the UE may instead select an "acceptable cell" (e.g., a cell meets the radio criteria for cell selection and the cell is not barred as described in 3GPP TS 38.304).

When the user equipment (UE) camps on an acceptable cell while in that idle or inactive state, the UE may only be able to access limited services, such as emergency calls, reception of public warning system (PWS) notifications or warning messages, and the like. While the user equipment camps on an acceptable cell for example, the UE may attempt to find a suitable cell. Moreover, if the UE supports voice services and the current cell does not support IMS emergency calls as indicated by the network in an initial broadcast, such as a System Information Block Type 1 (SIB1) ims-EmergencySupport as described in 3GPP TS 38.331 for example, the UE may perform cell selection or reselection to an acceptable cell that supports emergency calls, if a suitable cell is not found.

In 5G for example, a non-public network (NPN) may provide a 5G system for use by a private entity using virtual and/or physical elements. The NPN represents a closed access group such that unauthorized UEs (which are not allowed access to the NPN, not registered with the NPN, or not credentialed to access the NPN) are not authorized to access the resources of the NPN. The NPN may be deployed as a stand-alone NPN (SNPN) that is operated by an NPN operator without relying on the network functions provided by a public land mobile network. Alternatively, or additionally, the NPN may be integrated into the PLMN, in which case the NPN is provided with support from some of the network functions or nodes of the PLMN. This integrated NPN may be referred to as a public network integrated NPN (PNI-NPN). Alternatively, or additionally, the NPN may be provided as a network slice (e.g., a virtualized and independent logical network) of the PLMN. The NPN may be used to support services such as Ultra-reliable low-latency communication (uRLLC), massive machine-type communications (mMTC), low latency time sensitive networks (TSN), and other types of services.

Before the introduction of Non-Public Networks (NPNs), there was no need to require the user equipment to consider whether a given cell supports PWS notifications as part of cell selection or reselection, much less search for, or prioritize, a cell that supports PWS notifications as part of the selection of acceptable cells if a suitable cell is not found. Regulatory requirements for PWS notifications in cells belonging to NPNs may be different from so-called "public" cells that are part of a public network, such as the public land mobile network, and as such may be required to provide PWS notifications per regulatory requirements. For example, a UE may select an acceptable cell that does not provide PWS notifications, while other cells in the same area may provide PWS support. As PWS notifications may include important, if not critical or lifesaving information for example, not receiving a PWS notification may be a serious issue when, for example, the UE camps on a cell that does not provide PWS notifications. And, as these notifications in an NPN may include private or critical information, the NPN may want to prohibit non-allowed UEs (e.g., UEs which are not allowed, not registered, and/or not authorized access the NPN) from receiving (or at least accessing the contents of) the notification messages.

In some example embodiments, the network may provide an indication of PWS support. When a UE camps on an "acceptable" NPN-only cell (which is a cell that only provides a private wireless or cellular network such as an NPN) that does not provide PWS notifications, the UE may perform a cell selection or a reselection to, for example, an acceptable cell that does support PWS notifications, when a suitable cell is not found. The UE may perform the cell selection or reselection to the acceptable cell in any supported radio access technology regardless of priorities provided in system information from current cell. Among "acceptable cells" (e.g., cells which meet the radio criteria for cell selection and are not barred), the UE may prioritize cells which indicate support of IMS emergency bearer services and/or support of PWS notification, when selecting an acceptable cell to camp on.

To illustrate further, a user equipment (which does not receive a PWS support indication from a public or PLMN cell) may not need to look for another acceptable cell as the public, or PLMN, cell may be required per regulation to support PWS. If, however, a cell is an NPN cell and no PWS indicator is received, the UE (which prefers PWS notifications) may look for another acceptable cell (e.g., treat the lack of a PWS support indicator as PWS not being supported on that NPN cell).

In some example embodiments, a base station, such as a gNB type base station or other type of base station, may provide to the UE an indication regarding whether the radio access network, or cell, being served by the gNB supports PWS notifications. For example, network may provide the indication via a broadcast, such as SIB1, or via a message, such as a radio resource control (RRC) message. The indication may enable the UE to determine whether a cell supports PWS notifications, such that the UE can take this information into account when performing cell selection or reselection. When the UE determines whether a cell supports PWS notifications, the UE may also consider whether the cell is an NPN-only cell. The NPN-only cell refers to a cell that is only available for service for subscribers of the NPN (so UEs which are not associated with a subscribers may be barred). An NPN-capable UE may determine that a cell is an NPN-only cell by detecting that the cellReservedForOtherUse IE is set to true and the npn-IdentityInfoList IE is present in CellAccessRelatedInfo. For example, if a cell is part of the PLMN (e.g., not an NPN-only cell), that cell may support PWS even without the indicator of PWS being sent to the UE as in many jurisdictions the public cell is required to support PWS notifications (so even without the PWS indication, the UE can determine that the public cell supports PWS notifications).

FIG. 1 depicts an example of a process flow between a UE 102 and a radio access network (RAN) node, such as a gNB base station 110, in accordance with some example embodiments.

At 120, the gNB 110 may transmit a master information block (MIB). For example, the gNB 110 may transmit the MIB over a broadcast channel, such as a physical broadcast channel (PBCH), such that one or more UEs including UE 102 receive the MIB. The MIB may include the parameters needed to decode a system information block, such as SIB1.

At 122, the gNB 120 may transmit a system information block, such as SIB1, including the indication (labeled "indication of PWS support") of whether the cell (or radio access network) being served by the gNB supports PWS notifications. The SIB1 may be transmitted via a physical downlink shared channel (PDSCH), although other types of channels may be used as well. In addition to the indication 122, the SIB1 may include information which the UE may use to evaluate a cell, such as access related information (e.g. a public land mobile network identity list, a tracking area code, a cell identity, and/or the like), information for cell selection (e.g. a minimum required receive level in the cell and an offset), a frequency band indicator, scheduling information, a time division duplex (TDD) configuration, and/or the like. Table 1 below depicts an example of a portion of a SIB1 extended to include the indication of whether a cell supports PWS notifications. Referring to Table 1, the SIB1 at the bold text (e.g., npn-ETWS-CMAS-Support-rXX) may indicate as true that the cell supports PWS notifications or false that the cell does not support PWS notifications.

TABLE 1

```
-- ASN1START
-- TAG-CELLACCESSRELATEDINFO-START
CellAccessRelatedInfo ::=   SEQUENCE {
    plmn-IdentityList          PLMN-IdentityInfoList,
    cellReservedForOtherUse    ENUMERATED {true}  OPTIONAL, -- Need R
    ...,
    [[
    cellReservedForFutureUse-r16   ENUMERATED {true}  OPTIONAL, -- Need R
    npn-IdentityInfoList-r16   NPN-IdentityInfoList-r16 OPTIONAL
    --Need R
    ]],
    [[
    npn-ETWS-CMAS-Support-rXX   ENUMERATED {true}
    OPTIONAL, -- Need R
    ]]
}
-- TAG-CELLACCESSRELATEDINFO-STOP
-- ASN1STOP
```

Table 2 below depicts another example of a portion of a SIB1 extended to include the indication 122 of whether a cell supports PWS notifications. Referring to Table 2, the SIB1 at the bold text (e.g., pws-NotificationSupport) may indicate as true that the cell supports PWS notifications. The indication may not be present or may indicate as false that the cell does not support PWS notifications.

TABLE 2

```
-- ASN1START
-- TAG-SIB1-START
SIB1 ::=    SEQUENCE {
    cellSelectionInfo       SEQUENCE {
        q-RxLevMin          Q-RxLevMin,
        q-RxLevMinOffset    INTEGER (1..8)      OPTIONAL, -- Need S
        q-RxLevMinSUL       Q-RxLevMin          OPTIONAL, -- Need R
        q-QualMin           Q-QualMin           OPTIONAL, -- Need S
        q-QualMinOffset     INTEGER (1..8)      OPTIONAL -- Need S
    }                                           OPTIONAL, -- Cond Standalone
    cellAccessRelatedInfo   CellAccessRelatedInfo,
    connEstFailureControl   ConnEstFailureControl OPTIONAL, -- Need R
    si-SchedulingInfo       SI-SchedulingInfo   OPTIONAL, -- Need R
    servingCellConfigCommon ServingCellConfigCommonSIB  OPTIONAL, -- Need R
    ims-EmergencySupport    ENUMERATED {true}   OPTIONAL, -- Need R
    eCallOverIMS-Support    ENUMERATED {true}   OPTIONAL, -- Cond Absent
    ue-TimersAndConstants   UE-TimersAndConstants OPTIONAL, -- Need R
    uac-BarringInfo         SEQUENCE {
        uac-BarringForCommon        UAC-BarringPerCatList OPTIONAL, -- Need S
        uac-BarringPerPLMN-List     UAC-BarringPerPLMN-List OPTIONAL, -- Need S
        uac-BarringInfoSetList      UAC-BarringInfoSetList,
        uac-AccessCategory1-SelectionAssistanceInfo CHOICE {
            plmnCommon              UAC-AccessCategory1-SelectionAssistanceInfo,
            individualPLMNList      SEQUENCE (SIZE (2..maxPLMN))
                OF UAC-AccessCategory1-SelectionAssistanceInfo
        }                           OPTIONAL -- Need S
    }                               OPTIONAL, -- Need R
    useFullResumeID                 ENUMERATED {true}   OPTIONAL, -- Need R
    lateNonCriticalExtension        OCTET STRING        OPTIONAL,
    nonCriticalExtension            SIB1-vxy-IEs        OPTIONAL
}
UAC-AccessCategory1-SelectionAssistanceInfo ::= ENUMERATED {a, b, c}
SIB1-vxy-IEs: =     SEQUENCE {
    pws-NotificationSupport     ENUMERATED {true}   OPTIONAL, -- Need R
```

TABLE 2-continued

```
    nonCriticalExtension        SEQUENCE{ }     OPTIONAL
}
-- TAG-SIB1-STOP
-- ASN1STOP
```

At 125, the UE may make cell selection (or resection) based on the received indication, in accordance with some example embodiments. For example, the UE 102 may search for and select a cell, such as a suitable cell or an acceptable cell (if a suitable cell is not available) based on the indication received at 122. To illustrate further, the UE 102 may camp on the selected cell (e.g., by monitoring the cells control channel). If needed, the camped UE may register via a NAS registration procedure. If the UE finds a more suitable cell (based on noted criteria such as meeting certain radio criteria, not barring the UE from accessing the cell, and belonging to the network), the UE may reselect to the more suitable cell (or an acceptable cell if a suitable cell is not available) and again may camp on the selected/reselected cell. Accordingly, the indication received at 122 may enable the UE to make selection and/or reselection decisions based on whether a candidate cell supports PWS notifications. At 125, the UE may also take into account whether a cell is an NPN-only cell. As noted, the UE may determine that a cell, such as a cell providing a public cell of a PLMN, supports PWS notifications even without the indicator at 122.

In the example of FIG. 1, the gNB 110 may be serving an NPN including UE 102 (as well as other UEs), in which case the indication 122 of whether the cell supports PWS indicates whether the NPN cell supports PWS. Although the previous example describes the indication being used in cells that are associated with an NPN, the indication may also be used in a more "public" cells (e.g., cells which are not associated with a NPN) accessible to the public as part of the public land mobile network (PLMN).

In some example embodiments, there may be provided an indication of whether a non-allowed UE (which is also referred to herein as "non-authorized" or "unauthorized UE") is allowed to receive PWS notifications. The phrase "non-allowed UE" refers to a UE that is not authorized to access the cell (or a radio access network), due to closed access group restrictions does not have the credentials to access the cell (or the radio access network), and/or is not registered to access the cell (or a radio access network). In the case of an NPN cell for example, the unauthorized UE may not have the credentials or authorization to access the NPN (or its cell(s)/radio access network(s)). To illustrate further, the NPN cell may be a private radio access network at a factory. In this example, allowed UEs, such as the UEs associated with workers or machines at the factory, may access the NPN, but non-allowed UE, such as UEs not associated with the factory, may not be authorized or have the credentials to access the NPN. In the case of a public cell (which is not an NPN), the non-allowed UE may not be registered to access the PLMN (e.g., a UE which is not registered with any carrier or operator).

Figure 2:
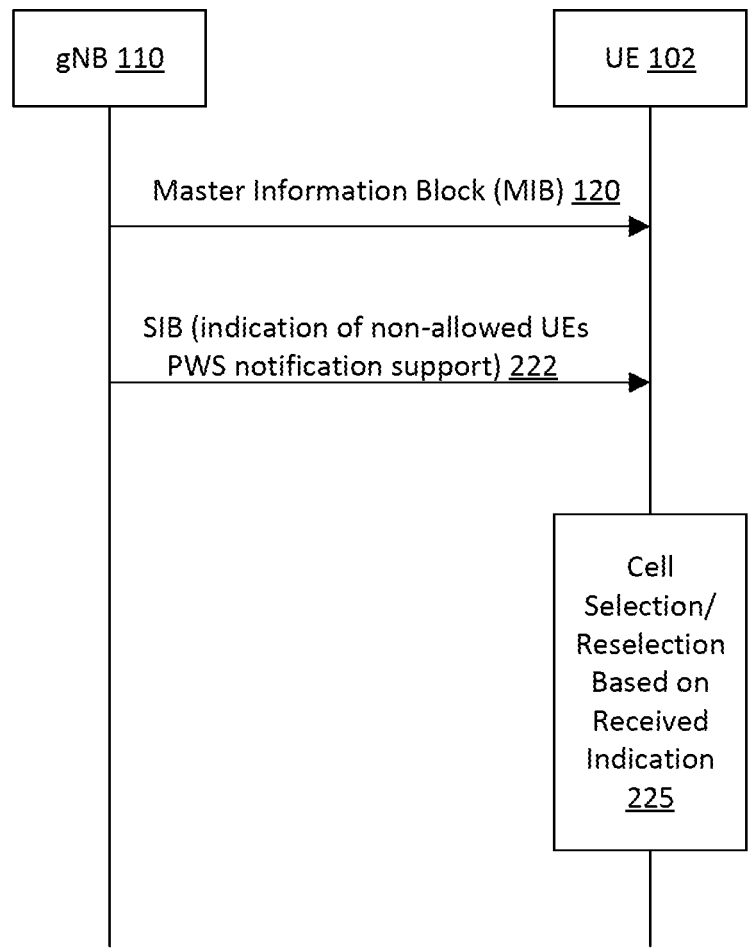
FIG. 2 depicts another example of a process flow related to support for public warning system messages, in accordance with some example embodiments.

FIG. 2 depicts an example of a process flow between a UE 102 and a radio access network (RAN) node, such as a gNB base station 110, in accordance with some example embodiments. As noted, the gNB 110 may transmit a master information block (MIB) to the UE 102.

At 222, the gNB 120 may transmit the system information block, such as SIB1, including the indication (labeled "indication of non-allowed UEs PWS notification support") of whether a non-allowed UE is allowed to receive PWS notifications in the cell being served by gNB 110. To illustrate further, the UE 102 (which in this example is a "non-allowed UE") may not be authorized to access the NPN being served by gNB 110. When this is the case, the SIB1 may indicate 122 whether this non-allowed UE may receive PWS notifications. If the indication indicates that a non-allowed UE may receive PWS notifications (or indicated there is no prohibition from receiving PWS notifications), the non-allowed UE 102 may receive and process (e.g., decrypt and/or present on a display) the PWS notifications even though the UE 102 is a not authorized, not registered, or not credentialed to be served by the NPN's cell/RAN served by gNB 110. If the indication indicates that a non-allowed UE may not receive PWS notifications (or indicated there is a prohibition from receiving PWS notifications), the non-allowed UE 102 will not read and not process the PWS notifications from the gNB 110.

The message may be broadcast to one or more UEs configured to receive from that gNB. For a PWS notification for example, this may be sent in the clear (e.g., in plaintext or without encryption), so that the UEs in the broadcast area can receive the broadcast. The need to prevent an unauthorized UE from receiving PWS arises when an NPN uses PWS infrastructure for proprietary communications to its NPN UEs. This would also be the situation for encrypted PWS. Some NPNs may provide support for both public PWS and private PWS, in which case any camped on UE might receive the notification, but only the authorized UEs (which are authorized access to the private or proprietary PWS) would have the key to unencrypt the proprietary notifications.

In some example embodiments, a SIB, such as SIB1, may be extended to include the indication 222 of whether a non-allowed UE can receive PWS notifications. Table 3 below depicts an example of a SIB1 extended (via the CellAccessRelatedInfo information element) to include the indication of whether a non-allowed UE can receive PWS notifications a cell supports PWS notifications. Referring to Table 3, the SIB1 at the bold text (e.g., npn-ETWS-CMAS-AuthorizationRequired) may indicate as true that the cell does not support a non-allowed UE receiving PWS notifications (e.g., only authorized UEs should receive the PWS notifications). The indication may not be present or may indicate as false that the cell supports all UEs receiving PWS notifications.

TABLE 3

-- ASN1START
-- TAG-CELLACCESSRELATEDINFO-START
CellAccessRelatedInfo ::=   SEQUENCE {
  plmn-IdentityList        PLMN-IdentityInfoList,
  cellReservedForOtherUse  ENUMERATED {true}  OPTIONAL,
  -- Need R
  ...,
  [[
  cellReservedForFutureUse-r16  ENUMERATED {true}  OPTIONAL, -- Need R
  npn-IdentityInfoList-r16   NPN-IdentityInfoList-r16 OPTIONAL
  --Need R
  ]],
  [[
  **npn-ETWS-CMAS-AuthorizationRequired-rXX ENUMERATED {true}
  OPTIONAL, --Need R**
  ]]
}
-- TAG-CELLACCESSRELATEDINFO-STOP
-- ASN1STOP At 225, the UE may make cell selection based on the indication received at 222, in accordance with some example embodiments. For example, the UE may search for a suitable cell, perform cell selection (or reselection) of a cell based on whether non-allowed UEs can receive PWS notifications from the cell. To illustrate further with gNB 110 serving an NPN cell, the UE may not have the credentials, not authorized, and/or not registered for NPN cell access. When this is the case, the UE 102 may decide whether to select or reselect the cell/RAN being served by gNB 110 based on whether non-allowed UEs can receive PWS notifications from the gNB 110. To illustrate further, the UE 102 may prioritize cell selection/reselection to a cell which does provide PWS notifications to non-allowed UEs, when compared to a cell that does not provide PWS notifications to non-allowed UEs. At 225, the UE may also take into account whether a cell is an NPN-only cell. As noted, the UE may determine that a cell, such as a cell providing a public cell of a PLMN, supports PWS notifications even without the indicator at 222.

Although Tables 1-3 depict examples of how to provide the indications 122 and 222 to the UE 102 via SIB1, there are many ways to provide the indication to the UE. For example, the indication provided to the UE 102 may indicate whether PWS is supported (as described at 122 above) and whether a non-allowed UE can receive PWS notification (as described at 222).

Table 4 below depicts an example of an extension of SIB1 where the CellAccessRelatedInfo information element indicates to the UE whether PWS is supported and whether a non-allowed UE can receive PWS notification using a single indicator. Specifically, the npn-ETWS-CMAS-Indicator indicates whether PWS is supported (e.g., notPresent indicates not supported; other values indicate supported) and whether a non-allowed UE can receives PWS notification (e.g., open indicates allowed to non-allowed UEs; authorizationRequired indicates not allowed to non-allowed UEs). When the UE 102 received an indication via a SIB1 as shown in Table 4, the UE may make cell selection (or reselection) decision, as noted above at 125 and 225, based on whether PWS is supported and whether a non-allowed UE can receive PWS notification.

TABLE 4

-- ASN1START
-- TAG-CELLACCESSRELATEDINFO-START
CellAccessRelatedInfo ::=   SEQUENCE {
  plmn-IdentityList        PLMN-IdentityInfoList,
  cellReservedForOtherUse  ENUMERATED {true}  OPTIONAL,
  -- Need R
  ...,
  [[
  cellReservedForFutureUse-r16  ENUMERATED {true}  OPTIONAL, -- Need R
  npn-IdentityInfoList-r16   NPN-IdentityInfoList-r16 OPTIONAL
  --Need R
  ]],
  [[
  npn-ETWS-CMAS-Indicator-rXX   ENUMERATED {open, authorizationRequired, notPresent} OPTIONAL, - Need R
  ]]
}
-- TAG-CELLACCESSRELATEDINFO-STOP
-- ASN1STOP Although the previous examples depict the indications 122/222 carried by SIB1, the indications may be provided in other ways to the UE 102. For example, the indication regarding whether PWS is supported (as described at 122 above) and/or whether a non-allowed UE can receive PWS notification 222 may be provided via a network access stratum (NAS) message, such as a radio resource control (RRC) registration message (e.g., RRC registration accept), a configuration update message (e.g., RRC configuration update), and/or other types of messages.

In some example embodiments, the network may encrypt PWS notification messages. For example, an identifier, such as a public key identifier, key set identifier, and/or the like, may identify the key used to encrypt the PWS notification. A network node may provide the identifier to the UE via a message or a broadcast. For example, the identifier for the key may be provided via a SIB, such as SIB1 and/or the like, and/or via a network access stratum (NAS) message, such as a registration message (e.g., registration accept), a configuration update message (e.g. configuration update command), and/or other types of NAS messages. The network node may provide to the UE the identifier of the key together with the PWS notification message(s). If, however, encryption is used, UEs (which are authorized, registered, and/or have credentials to access the network) may be the only UEs able to receive and decrypt the PWS notifications. In the case of an NPN for example, the cell of the NPN may require encryption of the PWS notifications as these PWS messages may contain private or proprietary information limited to authorized UEs of the NPN.

In some example embodiments, the UE and the network may be configured with keys, each of which may be identified by an identifier, such as a public key identifier, key set identifier, and/or the like. When a PWS warning message delivery process is triggered, this identifier of the key is indicated to the UE. Although some of the examples refer to a "key set identifier" that identifies security-related material (which can be used to encrypt/decrypt the warning message), it can be easily extended to any security-related material that can be used to encrypt and decrypt warning messages.

Figure 3:
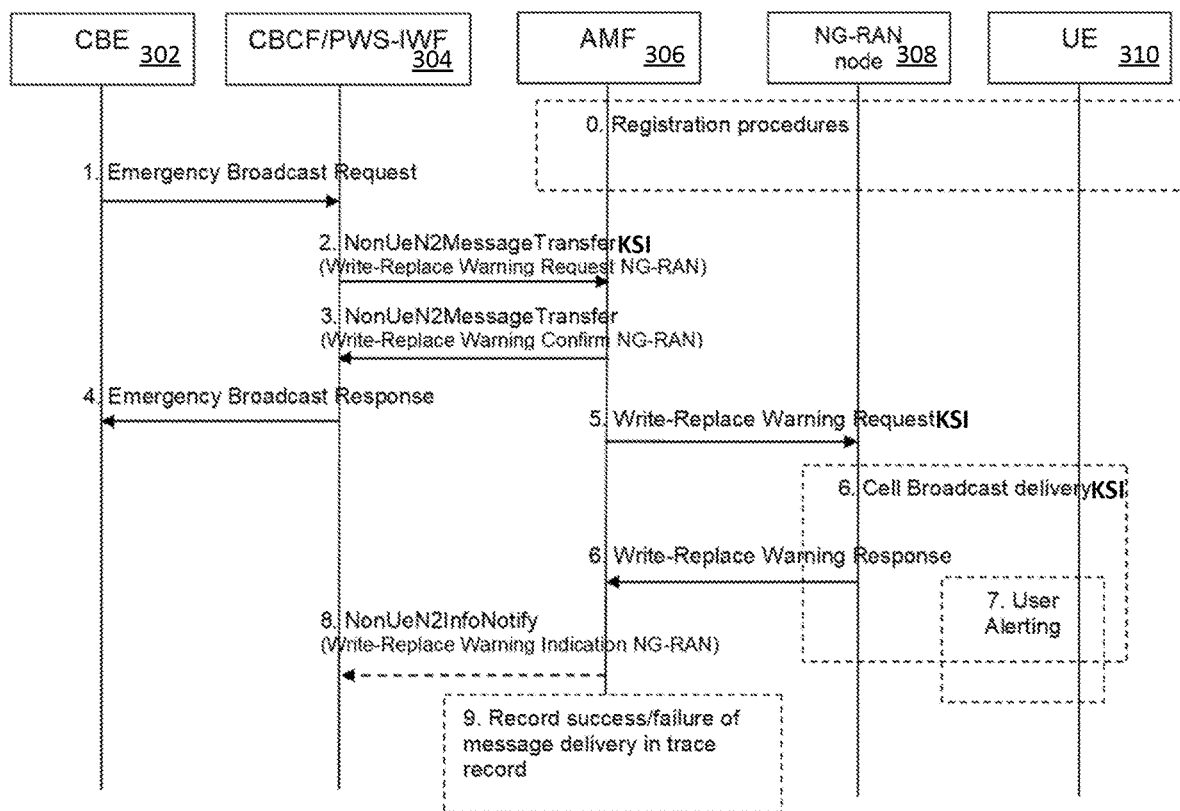
FIG. 3 depicts an example of a process flow related to encryption of public warning system messages, in accordance with some example embodiments.

FIG. 3 below depicts an example of a PWS warning message process, in accordance with some example embodiments. FIG. 3 depicts core network nodes, such as a cell broadcast entity (CBE) 302, a cell broadcast center function (CBCF) including a public warning system (PWS) interworking function (IWF) 304, and an access and mobility management function (AMF) 306. FIG. 3 further depict as New Generation (NG)-Radio Access Network node 308, such as a base station, gNB, and/or the like, serving one or more UEs, such as UE 310.

At 0, the process may include a registration process among the AMF 306, NG-RAN 308, and UE 310. At 1, the CBE 302 may send information regarding a warning to the CBCF/PWS-IWF 304. This information may include the type of warning, textual information about the warning, a time for the warning, and/or an area associated with the warning. For example, the information may be a power outage in a factory section at a given time.

At 2, the CBCF/PWS-IWF 304 may identify which AMFs are associated with the warning and any additional information for the warning message. The CBCF may then send a Write-Replace Warning Request NG-RAN message (which includes the warning message to be broadcast and the delivery attributes) to one or more AMFs, such as AMF 306, identified to provide the warning messages to the NPNs.

In some example embodiments, the CBCF 304 may encrypt, at 2, the warning message. For example, a network policy may indicate or require that a warning message be encrypted. To illustrate further, a network policy may require encryption for that a certain type of warning message, a warning message to a certain group of UEs, a warning message to a certain cell, a warning message to a certain NPN, and/or the like. When encryption is required, the CBCF may provide the AMF 306 with a key set identifier (KSI) identifying the keys used to encrypt (and/or decrypt) the warning message sent at 2, in accordance with some example embodiments. In accordance with some example embodiments, this key set identifier (KSI) may be provided to the AMF via the message sent at 2.

At 3, the AMF 306 may acknowledge message 2; at 4, the CBCF/PWS-IWF 304 may send an acknowledgement to the CBE 302.

At 5, the AMF 306 forwards the Write-Replace Warning Request (which includes the warning message to be broadcast and the delivery attributes including the KSI) to the NG-RAN node 308, in accordance with some example embodiments. If the AMF 306 receives a key set identifier from the CBCF 304, the AMF may, in response, forward the key set identifier (KSI) to the NG-RAN node 308 and the Write-Replace Warning Message Request, in accordance with some example embodiments.

At 6, the NG-RAN node 308 may broadcast for delivery to the UEs including UE 310 the warning message, in accordance with some example embodiments. In response to receiving the key set identifier (KSI) with the warning message (Write-Replace Warning Request at 5) from the AMF 306, the NG-RAN node 308 may broadcast, at 6, the key set identifier (KSI) along with the warning message to the UEs including UE 310, in accordance with some example embodiments. In the example of FIG. 3, the UE 310 may respond with an acknowledgement at 6.

The UE 310 may alert, at 7, a user associated with the UE (e.g., by presenting a message, an SMS text message, an audio indication, and/or a haptic indication) of the warning message received via the cell broadcast delivery from the NG-RAN node 308, in accordance with some example embodiments. If the broadcast includes and encrypted warning message and/or the key set identifier (KSI), the UE 310 may decrypt, at 7, the warning message using the key set identifier.

At 8, the AMF 306 may send a notification message regarding the broadcast to the CBCF/PWS-IWF 304. For example, the AMF may send broadcast scheduled area lists indicating the AMFs or areas over which the warning message is broadcasted. At 9, the AMF may store the success or failure of the broadcast delivery.

Although the previous example described the KSI being provided as part of the cell broadcast delivery of the warning messages, the AMF 306 may instead provide the KSI to the UE 310 via a NAS message. The CBCF 304 may update the AMF with a new key set identifier. When this case, the AMF may need to update the UE with the new key set identifier using a downlink NAS message, such as an RRC registration accept message, a configuration update message, and/or the like.

Figure 4:
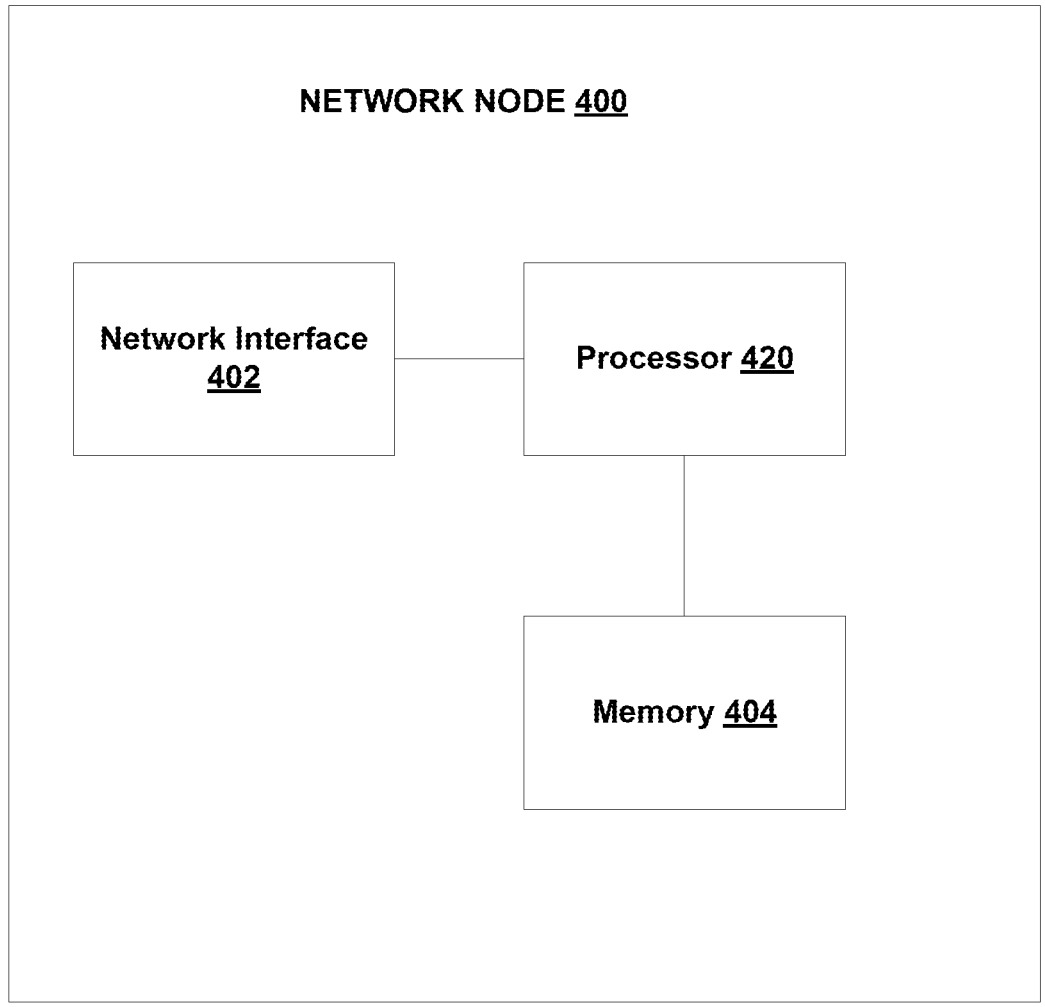
FIG. 4 depicts an example of a network node, in accordance with some example embodiments.

FIG. 4 depicts a block diagram of a network node 400, in accordance with some example embodiments. The network node 400 may be configured to provide one or more network side nodes or functions, such as a base station (e.g., gNB) 110/308, the CBE 302, the CBCF/PWS-IF 304, the AMF 306, and/or the like.

The network node 400 may include a network interface 402, a processor 420, and a memory 404, in accordance with some example embodiments. The network interface 402 may include wired and/or wireless transceivers to enable access other nodes including base stations, other network nodes, the Internet, other networks, and/or other nodes. The memory 404 may comprise volatile and/or non-volatile memory including program code, which when executed by at least one processor 420 provides, among other things, the processes disclosed herein with respect to the network nodes.

Figure 5:
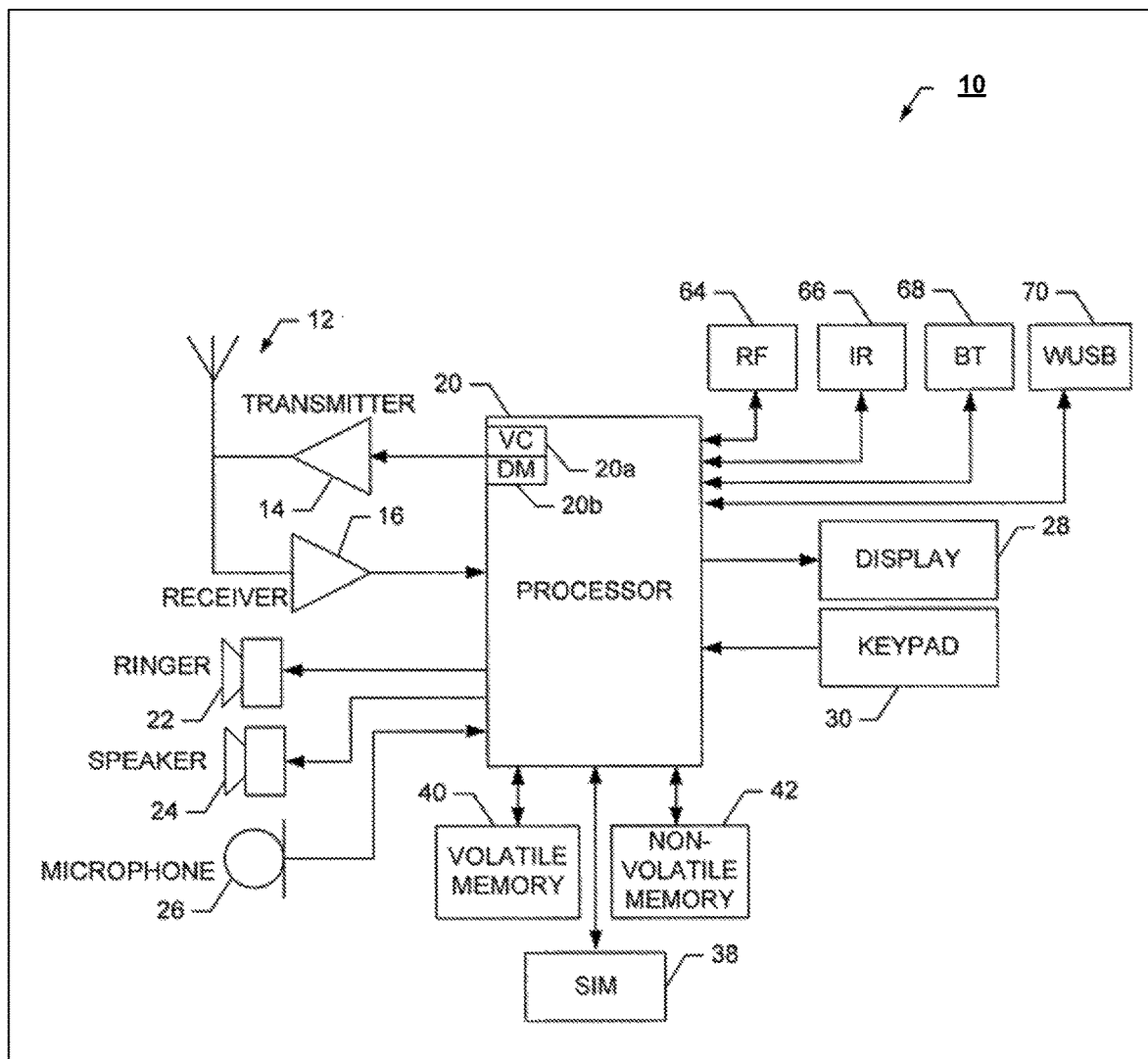
FIG. 5 depicts an example of an apparatus, in accordance with some example embodiments.

In some example embodiments, the network node may be configured to send an indication to at least a user equipment, wherein the indication indicates whether a radio access network provides support for public warning system warning messages and/or indicates whether the radio access network allows the public warning system warning messages to be received by non-allowed user equipment. The network node may also allow access to the radio access network based on the indication. The radio access network may serve a non-public network restricting access to a private set of user equipment. The radio access network may not provide the private set of user equipment access to radio resources of a public land mobile network. The non-public network may provide access to a closed group comprising the set of user equipment. The non-allowed user equipment may not be allowed to access resources of the non-public network, may not be registered with the non-public network, and/or may not be not credentialed to access the resources of the non-public network. The indication may be sent via a broadcast from the base station and/or sent via a message from the base station. The indication may be sent via a system information block type 1 broadcast and/or sent via a network access stratum message. An encrypted warning message of the public warning system may be sent via a cell broadcast from the base station. The key, an identifier for of key, a public key identifier, and/or or key set identifier may be sent from the cell broadcast or from a network access stratum message FIG. 5 illustrates a block diagram of an apparatus 10, in accordance with some example embodiments. The apparatus 10 may represent a user equipment, such as the user equipment 102, 310, and/or the like. In some embodiments, the UE may be comprised in, or comprise, an IOT device, in which case the UE may not have an associated user as in the case with other types of UEs, such as smartphones and the like.

In some example embodiments, the apparatus may be configured to receive an indication, wherein the indication indicates whether a radio access network provides support for public warning system warning messages and/or indicates whether the radio access network allows the public warning system warning messages to be received by non-allowed user equipment. The apparatus may also be configured to decide whether to select or reselect the radio access network based on the received indication. The radio access network may serve a non-public network restricting access to a private set of user equipment. The radio access network may not provide the private set of user equipment access to radio resources of a public land mobile network. The non-public network may provide access to a closed group comprising the set of user equipment. The non-allowed user equipment may not be allowed to access resources of the non-public network, is not registered with the non-public network, and/or is not credentialed to access the resources of the non-public network. The indication may be received via a broadcast from a base station and/or received via a message from the base station. The indication may be received via a system information block type 1 broadcast and/or received via a network access stratum message. An encrypted warning message of the public warning system may be received via a cell broadcast from a base station. The encrypted warning message may be decrypted, based on a key. The key, an identifier of the key, a public key identifier, and/or or key set identifier may be received via the cell broadcast or via a network access stratum message. The deciding may further include prioritizing the selection of the radio access network when the radio access network provides support for public warning system warning messages and/or allows the public warning system warning messages to be received by non-allowed user equipment.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced handling of public warning messages such that cell selection may take into account support for public warning systems.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phrase "such as" means "such as for example" unless otherwise indicated.

What is claimed is:

1. A method comprising:
   receiving, from a radio access network providing a stand-alone non-public network, an indication at a user equipment that is not credentialed to access the stand-alone non-public network provided by the radio access network, wherein the indication indicates that the radio access network providing the stand-alone non-public network supports public warning system warning messages to devices despite not being credentialed to access the stand-alone non-public network, wherein the stand-alone non-public network does not rely on radio resources provided by a public land mobile network;
   deciding, by the user equipment, whether to select or reselect the radio access network providing the stand-alone non-public network, the decision based on the received indication, wherein the selection or reselection decision prioritizes the selection or resection of the stand-alone radio access network in response to the stand-alone radio access network supporting the public warning system warning messages to devices despite not being credentialed to access the stand-alone non-public network; and
   in response to the decision, selecting or reselecting the radio access network providing the stand-alone non-public network.

2. The method of claim 1, wherein the radio access network serves the stand-alone non-public network restricting access to a private set of user equipment.

3. The method of claim 2, wherein the radio access network does not provide the private set of user equipment access to the radio resources of the public land mobile network.

4. The method of claim 1, wherein the indication is received via a broadcast from a base station and/or received via a message from the base station.

5. The method of claim 1, wherein the indication is received via a system information block type 1 broadcast and/or received via a network access stratum message.

6. The method of claim 1 further comprising:
   receiving, by the user equipment that is not credentialed to access the stand-alone non-public network provided by the radio access network via a cell broadcast from a base station of the stand-alone radio access network, an encrypted warning message of the public warning system; and
   decrypting, by the user equipment and based on a key, the encrypted warning message, wherein the key, an identifier of the key, a public key identifier, and/or or key set identifier are received via the cell broadcast or via a network access stratum message.

7. An apparatus comprising:
   at least one processor; and
   at least one memory including computer program code, the at least one memory and the computer program code configured to, with the at least one processor, cause the apparatus to at least:
   receive from a radio access network providing a stand-alone non-public network an indication, wherein the apparatus is not credentialed to access the stand-alone non-public network provided by the radio access network, wherein the indication indicates that the radio access network providing the stand-alone non-public network supports to devices despite not being credentialed to access the stand-alone non-public network public warning system warning messages, wherein the stand-alone non-public network does not rely radio resources provided by a public land mobile network; and decide whether to select or reselect the radio access network providing the stand-alone non-public network, the decision based on the received indication, wherein the selection or reselection decision prioritizes the selection or resection of the stand-alone radio access network in response to the stand-alone radio access network supporting the public warning system warning messages to devices despite not being credentialed to access the stand-alone non-public network; and in response to the decision, select or reselect the radio access network providing the stand-alone non-public network.

8. The apparatus of claim 7, wherein the apparatus comprises, or is comprised in a user equipment.

9. The apparatus of claim 7, wherein the radio access network serves the stand-alone non-public network restricting access to a private set of user equipment.

10. The apparatus of claim 8, wherein the radio access network does not provide the private set of user equipment access to the radio resources of the public land mobile network.

11. The apparatus of any claim 7, wherein the indication is received via a broadcast from a base station and/or received via a message from the base station.

12. The apparatus of claim 7, wherein the indication is received via a system information block type 1 broadcast and/or received via a network access stratum message.

13. The apparatus of claim 7, wherein the apparatus is further caused to:

receive, via a cell broadcast from a base station of the stand-alone radio access network, an encrypted warning message of the public warning system; and decrypt, based on a key, the encrypted warning message, wherein the key, an identifier of the key, a public key identifier, and/or or key set identifier are received via the cell broadcast or via a network access stratum message.

* * * * *